(12) United States Patent
Eynard

(10) Patent No.: US 6,598,644 B2
(45) Date of Patent: Jul. 29, 2003

(54) TIRE BEAD

(75) Inventor: Claude Eynard, Chanat-la Mouteyre (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 10/208,403

(22) Filed: Jul. 30, 2002

(65) Prior Publication Data

US 2003/0034109 A1 Feb. 20, 2003

Related U.S. Application Data

(63) Continuation of application No. PCT/EP01/01187, filed on Feb. 5, 2001.

(30) Foreign Application Priority Data

Feb. 10, 2000 (FR) .............................. 00 01685

(51) Int. Cl.$^7$ .................. B60C 15/00; B60C 15/02; B60C 15/06
(52) U.S. Cl. ............. 152/547; 152/539; 152/542; 152/543; 152/544; 152/552
(58) Field of Search ................. 152/539, 543, 152/545, 552, 540, 541, 542, 544, 547

(56) References Cited

U.S. PATENT DOCUMENTS

| | | | |
|---|---|---|---|
| 5,443,105 A | 8/1995 | Ushikubo et al. | |
| 5,634,993 A | 6/1997 | Drieux et al. | |
| 5,785,781 A | 7/1998 | Drieux et al. | |
| 5,971,047 A | 10/1999 | Drieux et al. | |
| 6,092,575 A | 7/2000 | Drieux et al. | |
| 6,463,975 B1 * | 10/2002 | Auxerre ............... | 152/539 X |
| 2001/0006085 A1 | 7/2001 | Chandezon et al. | |

FOREIGN PATENT DOCUMENTS

| | | |
|---|---|---|
| DE | 3522332 | 1/1987 |
| EP | 0615868 | 9/1994 |
| FR | 1327810 | 9/1963 |
| FR | 2699121 | 6/1994 |
| FR | 2779386 | 12/1999 |
| JP | 2000118209 | 4/2000 |
| WO | WO-99/34989 A1 * | 7/1999 |

* cited by examiner

Primary Examiner—Adrienne C. Johnstone
(74) Attorney, Agent, or Firm—Baker Botts L.L.P.

(57) ABSTRACT

A tire having at least one bead seat inclined towards the outside and a radial carcass reinforcement (1) wound within said bead around a bead wire (2) from the heel to the toe of the bead B to form an upturn (10), the edge of which, viewed in meridian section, is located on the radially outer face (31) of a profiled element (3) of rubber mix. The profiled element is located axially and externally adjacent to the bead wire (2), and has, viewed in meridian section, the shape of a drop of water with an apex A located beneath the section of the bead wire (2), and a Shore A hardness greater than the Shore A hardness(es) of the rubber mixes (6, 7) located axially and radially above the bead wire/profiled element assembly. The carcass reinforcement upturn (10) is extended by a reinforcement armature (11) which surrounds the profiled element (3).

8 Claims, 3 Drawing Sheets

TIRE BEAD

CROSS-REFERENCE TO RELATED APPLICATIONS

This is a continuation of international application No. PCT/EP 01/01187 filed Feb. 5, 2001, published in French as international publication No. WO 01/58705 on Aug. 16, 2001.

BACKGROUND OF THE INVENTION

1. Technical Field of the Invention

The present invention relates to a tire having a radial carcass reinforcement, and more particularly to the structure of the beads of the tire. Still more particularly, the invention relates to a tire in which at least one of the beads has a structure which permits modification of the clamping of the bead on its rim according to the tension of the carcass reinforcement, and in particular an increase thereof when the inflation pressure increases up to its rated value.

2. The Related Art

A tire of the aforementioned type, which has the special feature of overcoming the problems of rotation on the rim while remaining easy to mount and dismount, is described in U.S. Pat. No. 5,971,047. Such tire, which is mounted on its rim and inflated to its operating pressure, comprises a radial carcass reinforcement, viewed in meridian section, which is wound in at least one bead around at least one bead wire coated with rubber mix, from the heel to the toe of the bead, to form an upturn extending in a profiled element of rubber mix in the form of a wedge defined by two sides coming from an apex located beneath the section of the coated bead wire. The radially outer side forms, with a line parallel to the axis of rotation passing through the apex, an acute angle $\phi_1$, open radially towards the outside, and the radially inner side forms with the parallel line an acute angle $\phi_2$, open radially towards the inside. The rubber mix forming the profiled element, axially adjacent to the bead wire, has a Shore A hardness greater than the Shore A hardnesses of the rubber mixes located axially and radially above the bead wire and the profiled element.

Although the invention described and claimed in the '047 patent referred to above applies whatever the inclination of the bead seat, it is particularly beneficial in the case of seats inclined towards the outside of the tire, the toes of the beads then being to the outside.

Likewise, the carcass reinforcement upturn preferably has a length such that it is in contact with the total perimeter of the profiled element or wedge. It thus forms the two, radially outer and inner, edges of the rubber profiled element and the side opposite the apex or center of the profiled element. The end thereof is located axially beyond the point of intersection of the two, outer and inner, sides. The part of the upturn immediately adjacent to the part of the upturn which is wound about the bead wire can form, firstly, the radially outer side of the profiled element or wedge, then the side opposite the apex of the profiled element, and then finally the radially inner side of the profiled element, ending beyond the junction point of the two, outer and inner, sides. It may also first form the radially inner side of the profiled element or wedge, then the side opposite the apex of the profiled element, and then finally the radially outer side of the profiled element, ending in the same manner as previously described.

The operations of mounting and dismounting such tires having bead seats inclined towards the outside require the use of mounting and/or dismounting levers. Such a use involves cutting the protective rubber mix of the beads, more particularly in the zone of the bead seats. The cuts are propagated during travel towards the reinforcement elements of the carcass reinforcement and cause such elements to be bared, with breaking the elements. The cuts furthermore reach the reinforcement elements themselves in many cases. In any case, the degradation of the reinforcement elements following such cuts allows the inflation gas, air and humidity to infiltrate into the elements, resulting in separation between reinforcement elements and the rubber calendering layer covering them. The separations are revealed by the presence of pockets of varying sizes on the sidewalls of the tire.

The object of the invention is a solution for overcoming the above drawbacks.

SUMMARY OF THE INVENTION

In accordance with the invention, a tire is provided having at least one bead seat inclined towards the outside and a radial carcass reinforcement wound within said bead around a bead wire from the heel to the toe of the bead to form an upturn, the edge of which, viewed in meridian section, is located on the radially outer face of a profiled element of rubber mix, axially and externally adjacent to the bead wire. The profiled element, viewed in meridian section, has the shape of a drop of water with an apex located beneath the section of the bead wire, and a Shore A hardness greater than the Shore A hardness(es) of the rubber mixes located axially and radially above the bead wire/profiled element assembly. The carcass reinforcement upturn is extended by a reinforcement armature which surrounds the profiled element and which is turned up about the bead wire, the upturn of the carcass reinforcement and the reinforcement armature overlapping over an axial distance at least equal to half the axial width of the bead seat, and the radial distance between respective reinforcement elements of the two reinforcements being at least equal to 0.6 mm.

As used herein, the term "shape of a drop of water" is to be understood to mean a geometric shape approaching the shape of a circular sector, that is to say, a sector defined by two sides or radii departing from an apex or center of the sector, the two ends of the two sides defining a third circular side opposite the apex. The shape of a drop of water differs from the theoretical shape of such a sector by the fact that the two sides coming from the apex may be curved, and that the circular side opposite the apex is either at a tangent to the other two sides, or joined to the other two sides by arcs of a circle which are tangent. The profiled element in the shape of a drop of water is located between two straight half-lines which are tangent to the anchoring bead wire coated with rubber mix and to the carcass reinforcement: the first half-line forms with a line parallel to the axis of rotation an angle which is open radially towards the outside and which may be between 40° and 80°, the second half-line forms with a line parallel to the axis of rotation an angle which is open towards the inside and which may be between 0° and 30°, and the two half-lines are secant at a point which is the apex of the drop-of-water shape.

The constitution of the reinforcement armature of the profiled element may be different from the constitution of the carcass reinforcement, and may be obtained in various way. The difference may advantageously lie, for example, in the number of plies respectively forming the two reinforcements: the number of plies being greater in the reinforcement armature of the profiled element;

in the use in the reinforcement plies of the profiled element of reinforcement elements which differ in their modulus and/or in their nature: use of textile elements in the carcass reinforcement and of elastic metal elements in the bead reinforcement armature;

in the use of spacing between adjacent reinforcement elements which are different for the two reinforcements: the reinforcement elements of the reinforcement ply of the profiled element are closer to each other than are the elements of the carcass reinforcement;

in the use for calendering of the respective reinforcement elements of the two reinforcements of rubber mixes which differ in their composition and/or elasticity modulus, for example, shearing modulus; and in the orientation, relative to the circumferential direction, of the reinforcement elements of the two reinforcements.

Advantageously, the rubber mix forming the drop-of-water-shaped profiled element, axially adjacent to the bead wire, will have a Shore A hardness at least equal to 65 (measured in accordance with ASTM Standard D.67549T).

Preferably, the bead wire is of the braided type, that is to say, a bead wire formed of a core around which are wound (a) cord(s) or cable(s) in one or more layers. As is known per se, the layer(s) of cord(s) or cable(s) are able to turn about the core.

The bead wire reinforcing the bead is surmounted radially to the outside by a substantially triangular profiled element of rubber mix preferably having a Shore A hardness of less than 50. The space located, on the one hand, axially adjacent to the profiled element radially surmounting the bead wire and, on the other hand, radially adjacent to the profiled element or wedge axially next to the bead wire is filled with a third profiled element of rubber mix of substantially triangular shape, such mix also having a Shore hardness of less than 50.

The reinforcement armature of the profiled element surrounds the profiled element and is turned up about the bead wire, the latter already being covered by the carcass reinforcement. It is advantageous for the radial distance between the respective reinforcement elements of two adjacent plies of the two reinforcements to be at least equal to 0.9 mm beneath the bead wire. This excess thickness permits additional protection of the carcass reinforcement.

BRIEF DESCRIPTION OF THE DRAWINGS

The invention will be better understood with reference to the accompanying drawings, which illustrate non-limitative examples of embodiments of tires according to the invention, in which.

DETAILED DESCRIPTION OF EXEMPLARY EMBODIMENTS

Figure 1:
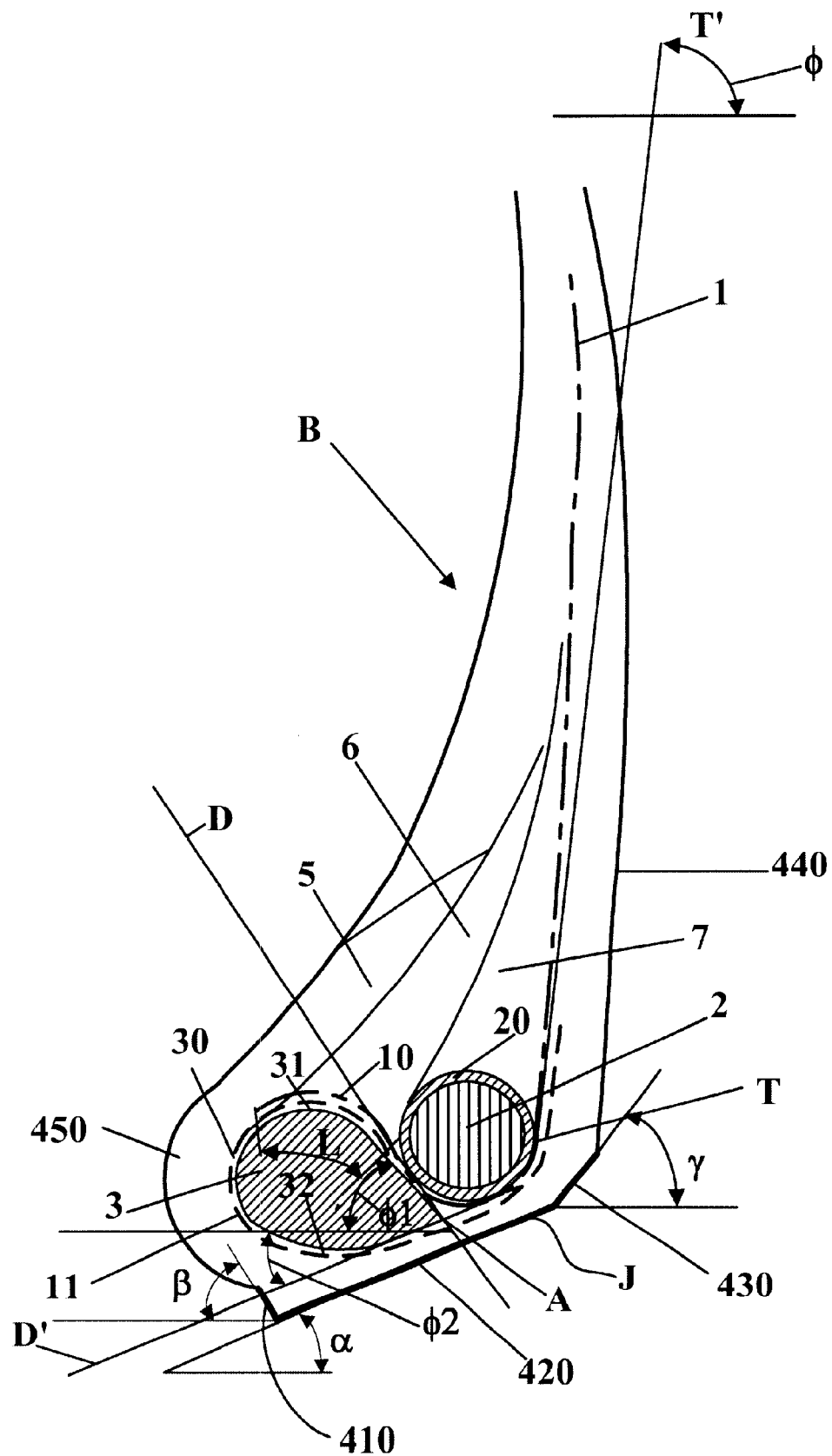
FIG. 1 is a diagram, viewed in meridian section, of a tire bead according to a first embodiment in accordance with the invention.

In the embodiment of the invention shown in FIG. 1, the bead B of a passenger-vehicle tire comprises a bead wire 2 of "braided" type coated in a rubber mix 20 around which there is wound a carcass reinforcement 1, to form an upturn 10. The carcass reinforcement is composed, in the example illustrated, of a single ply of radial textile cables, e.g., rayon cables laid in a number of 120 cables per dm. The meridian profile of the center line of the carcass reinforcement 1 (in broken lines) is tangent to the coated bead wire 2 at a point T. The tangent line TT' forms, with a line parallel to the axis of rotation of the tire, an angle ø of 85°, which opens radially towards the outside and axially towards the inside. The contour of the bead B comprises, axially to the inside, a wall 440 substantially perpendicular to the axis of rotation of the tire and intended to bear laterally against the axially inner flange of the mounting rim J. This rim J is a rim such as is described in French Patent 2 699 121. That is to say, it has the special feature of having at least one rim seat inclined towards the outside, which seat is extended axially to the inside, either by a rim flange or by the rim base on which a bearing support for the tread is placed, a lateral face of the support being used as a rim flange, and axially to the outside by a protrusion or hump of low height.

The wall 440 of the bead B is extended axially to the outside by a frustoconical generatrix 430, which forms with a line parallel to the axis of rotation an angle γ of 45° opening axially towards the inside and radially towards the outside. The generatrix 430 is itself extended axially to the outside by a second frustoconical generatrix 420 of the bead seat forming with the direction of the axis of rotation an angle α of 15°, which opens axially towards the inside and radially towards the outside. The generatrix 420 is inclined towards the outside, and its axially outer end is on a circle of a diameter less than the diameter of the circle on which its axially inner end is located. A frustoconical generatrix 410 which extends the generatrix 420 axially to the outside and forms with the direction of the axis of rotation an angle β of 45° opening axially and radially towards the outside, completes the contour of the base of the bead B. The wall 450, which is curved in the example described and is of substantially perpendicular general orientation to the direction of the axis of rotation of the rim, completes the contour of the bead B.

Whereas the generatrix 420 will bear on the rim seat, which is inclined towards the outside, the generatrix 410 will bear on the axially inner wall of the protrusion or hump of the rim, which is inclined by the same angle β as the generatrix 410. The portion of the bead adjacent to the wall 440 and to the generatrix 420 forms, viewed in meridian section, the heel of the bead B. The portion of the bead adjacent to the generatrix 420, to the generatrix 410 and partially to the wall 450 forms the toe of the bead B.

The carcass reinforcement 1 is wound around the coated bead wire 2 in the direction from the heel to the toe of the bead B to form a curved upturn 10 which partially forms the radially outer wall of a profiled element 3, arranged axially to the outside of the anchoring bead wire 2 of the carcass reinforcement 1. This profiled element 3 is in the shape of a drop of water, a shape which is close to the geometrical shape of a substantially circular sector with an apex or center A located radially beneath the bead wire 2, two sides or radii 31 and 32 starting from the apex A and which are curved, and a third side 30 opposite the apex A. The apex A is defined as being the intersection of two half-lines D and D'. The straight line D is tangent, on one hand, to the coated bead wire 2 around which is wound the carcass reinforcement 1 and forming, on the other hand, an angle $ø_1$ of 65° with a line parallel to the axis of rotation passing through point A. The straight line D' is, on one hand, tangent to the bead wire 2 as above and, on the other hand, forms an angle $ø_2$ of 15° with the aforementioned straight line parallel to the axis of rotation. The radially outer side or radius 31 is an arc of a circle tangent to the straight line D, whereas the radially inner side or radius 32 is also an arc of a circle tangent to the straight line D'. The side 30 is a third arc of a circle tangent to the other sides 31 and 32. The profiled element 3, the contour of which is thus defined, is formed of a rubber mix having in the vulcanized state a Shore A hardness of 94.

If the upturn 10 covers practically the whole side 31 of the contour of the profiled element 3, the rest of the contour is covered by a reinforcement armature 11 of the profiled element 3 composed of a single ply of radial cables made of rayon and in the same number of cables per dm. The cables of the armature 11 are calendered in the same rubber mix as that used for the calendering of the carcass reinforcement 1. The radial spacing between two respective cables of the carcass reinforcement upturn 1 and of the reinforcement ply 11, which is adjacent thereto at the level of the overlap existing between the two reinforcements, is 0.9 mm.

The length L of overlap between the upturn 10 of the carcass reinforcement 1 and the reinforcement ply 11 of the profiled element is greater than half the axial width of the bead seat 420, which may vary according to the dimensions of tires in question between 10 and 14 mm.

The coated bead wire 2 is surmounted radially to the outside by a profiled element 7 of rubber mix of a Shore A hardness of 37. Radially to the outside of the profiled element 3 and axially to the outside of said profiled element 7 there is arranged a third profiled element 6 of rubber mix having a Shore A hardness equal to that of the profiled element 7 and, hence, clearly less than the hardness of the mix of the profiled element 3. This makes it possible, when the tension in the carcass reinforcement increases, to facilitate the axial displacement of the braided bead wire 2 towards the outside of the bead B, and thus to create compression of the profiled element 3 and self-clamping of the toe of the bead on the mounting rim J, whereas, in the case described, the initial clamping of the bead B on the rim J is zero. The bead B is finished off by the protector 5.

Figure 2:
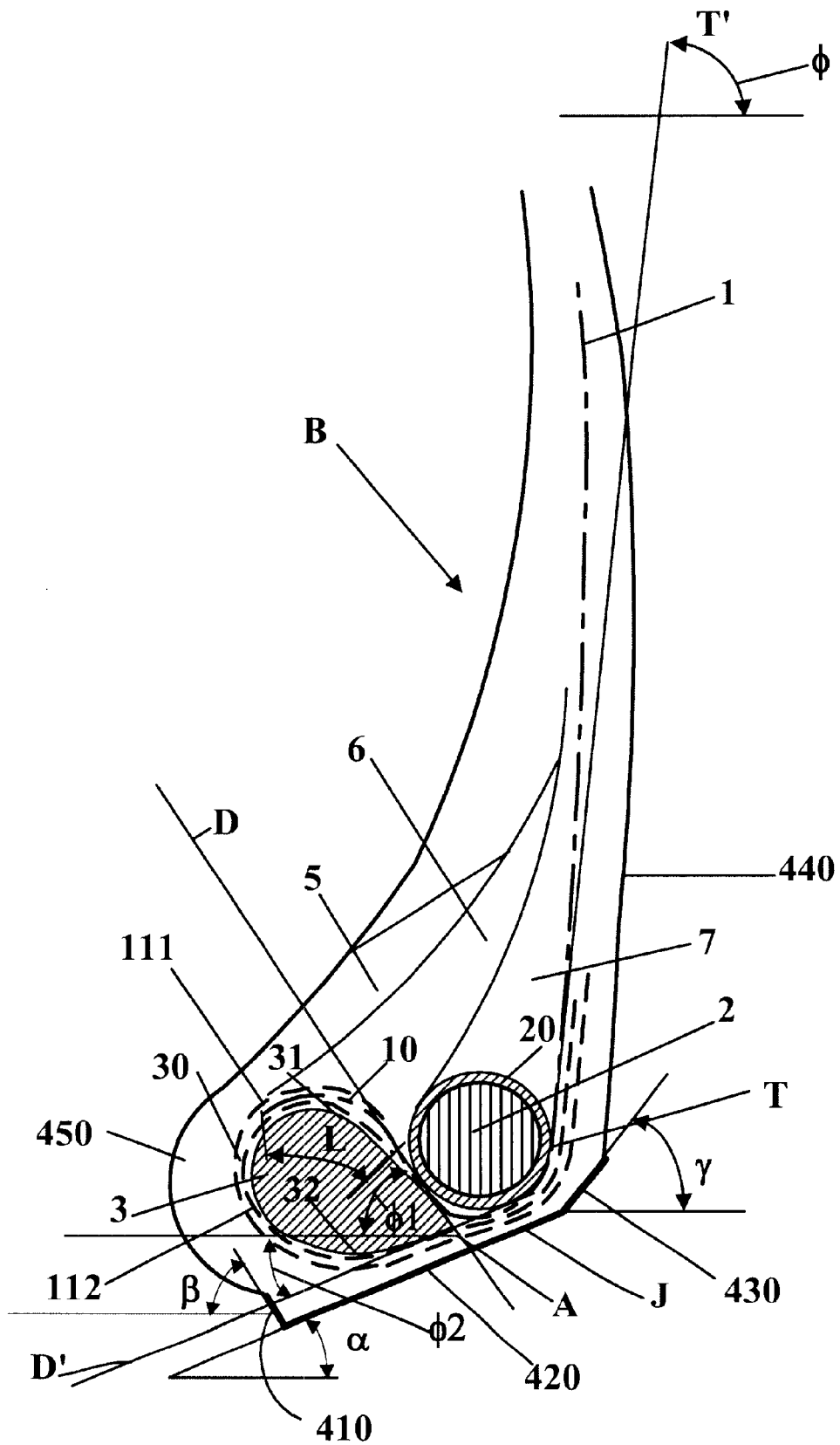
FIG. 2 is a diagram of a tire bead according to a second embodiment according to the invention.

The bead variant shown in FIG. 2, wherein like elements are identified by the same reference numbers, differs from that shown in FIG. 1 and described above by the fact that the reinforcement armature of the profiled element 3 is formed of two plies 111 and 112 of cables of aliphatic polyamide, which are parallel to each other within each ply 111, 112 and in the number of 90 cables per dm, and are crossed from one ply 111 to the next 112, forming with the circumferential direction an angle of 45°. The same carcass reinforcement ply is provided in the embodiment of FIG. 2 as in that of FIG. 1, and the same calendering of the cables is used.

Figure 3:
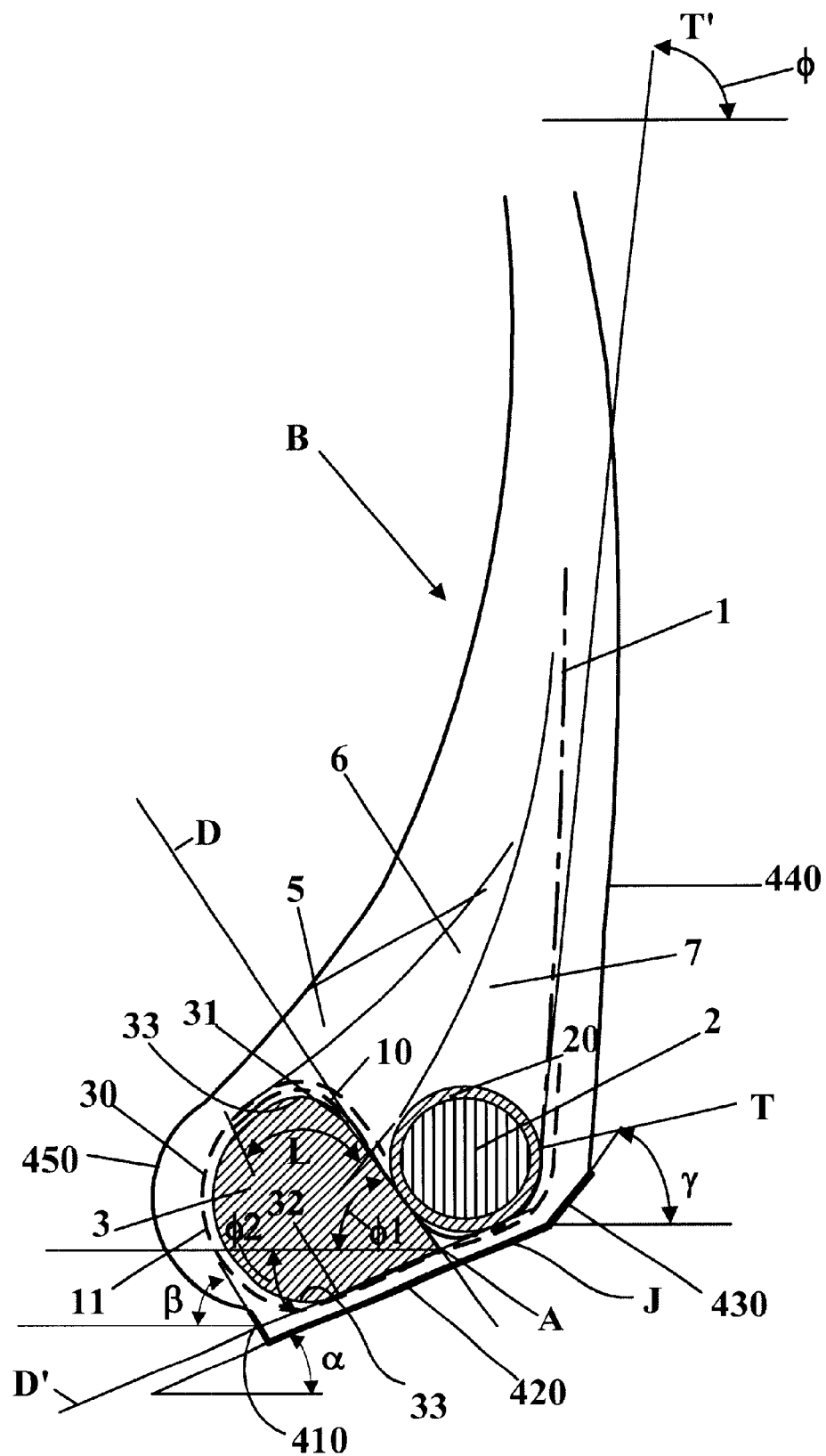
FIG. 3 is a diagram of a third embodiment of a tire bead according to the invention.

The variant of FIG. 3, wherein like elements are again identified by like reference numbers, differs from the two previous ones by the shape of the profiled element 3 and by the constitution of the reinforcement armature 11. The profiled element 3 has a contour which is closer to a true sector of a circle than are the two preceding contours. In FIG. 3, the two sides 31 and 32 of the element 3, although remaining curved, have a larger radius of curvature than the circular side 30 opposite the apex A. The sides 31, 32 are then joined to the side 30 by arcs of a circle 33 of small radius. As for the single reinforcement ply 11 in this embodiment, it is formed of elastic metal cables, that is to say, cables which, under a tensile force equal to 10% of their breaking load, have a relative elongation of at least 2%. The metal cables are laid with a pitch between cables of 1 mm and, as known, are calendered in a rubber mix permitting gluing to the metal. The presence of metal cables ensures better protection of the carcass reinforcement cables that are radially higher than it at the level of the bead wire.

What is claimed is:

1. A tire having at least one bead with a seat inclined towards the outside and a radial carcass reinforcement wound within said bead around an anchoring bead wire from the heel to the toe of the bead B to form an upturn, the edge of said upturn, viewed in meridian section, being located on the radially outer face of a profiled element of rubber mix, said profiled element being axially and externally adjacent to the bead wire, and having, viewed in meridian section, the shape of a drop of water with an apex A located beneath the section of the bead wire, and a Shore A hardness greater than the Shore A hardness(es) of the rubber mixes located axially and radially above the bead wire/profiled element assembly, wherein the carcass reinforcement upturn is extended by a reinforcement armature which surrounds said profiled element and which is turned up about the bead wire, the upturn of the carcass reinforcement and said reinforcement armature overlapping over an axial distance L at least equal to half the axial width of the bead seat, and the radial distance between respective reinforcement elements of the carcass reinforcement and the reinforcement armature being at least equal to 0.6 mm.

2. A tire according to claim 1, wherein the reinforcement armature of the profiled element has a different constitution from that of the upturn of the carcass reinforcement.

3. A tire according to claim 1, wherein the constitution of the reinforcement armature of the profiled element differs from the constitution of the carcass reinforcement in the nature of the reinforcement elements used in the reinforcement armature and the carcass reinforcement, respectively.

4. A tire according to claim 1, wherein the constitution of the reinforcement armature of the profiled element differs from the constitution of the carcass reinforcement by the number of plies used in the reinforcement armature and the carcass reinforcement, respectively, the number of plies being greater in the reinforcement armature of the profiled element.

5. A tire according to claim 1, wherein the constitution of the reinforcement armature of the profiled element differs from the constitution of the carcass reinforcement by the orientation relative to the circumferential direction of the reinforcement elements in the reinforcement armature and the carcass reinforcement, respectively.

6. A tire according to claim 1, wherein the rubber mix forming the water-drop-shaped profiled element, axially adjacent to the bead wire, has a Shore A hardness at least equal to 65.

7. A tire according to claim 1, wherein the anchoring bead wire of the carcass reinforcement is of the braided type, formed of a core around which are wound one or more cords or cables in one or more layers.

8. A tire according to claim 1, wherein a profiled element of rubber mix of substantially triangular shape surmounts radially to the outside the anchoring bead wire and a profiled element of substantially triangular shape fills the space axially adjacent to the profiled element radially surmounting the bead wire and radially adjacent to the profiled element of water-drop shape axially adjacent to the bead wire, said triangular-shaped profiled elements having a Shore hardness of less than 50.

* * * * *

UNITED STATES PATENT AND TRADEMARK OFFICE
CERTIFICATE OF CORRECTION

PATENT NO.    : 6,598,644 B2
DATED         : July 29, 2003
INVENTOR(S)   : Eynard, Claude It is certified that error appears in the above-identified patent and that said Letters Patent is hereby corrected as shown below:

<u>Title page,</u>
Item [75], Inventors, "Chanat-la Mouteyre" should read -- Chanat-la-Mouteyre --

Signed and Sealed this

Eighteenth Day of November, 2003

JAMES E. ROGAN
*Director of the United States Patent and Trademark Office*